(12) United States Patent
Suh et al.

(10) Patent No.: US 9,485,489 B2
(45) Date of Patent: *Nov. 1, 2016

(54) BROADCASTING RECEIVER AND METHOD FOR DISPLAYING 3D IMAGES

(71) Applicant: LG ELECTRONICS INC., Seoul (KR)

(72) Inventors: Jong Yeul Suh, Seoul (KR); Jin Pil Kim, Seoul (KR); Kwan Suk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/937,510

(22) Filed: Nov. 10, 2015

(65) Prior Publication Data

US 2016/0065933 A1 Mar. 3, 2016

Related U.S. Application Data

(63) Continuation of application No. 13/521,384, filed as application No. PCT/KR2011/000136 on Jan. 10, 2011, now Pat. No. 9,215,444.

(60) Provisional application No. 61/294,090, filed on Jan. 11, 2010.

(51) Int. Cl.
| | |
|---|---|
| *H04N 13/00* | (2006.01) |
| *H04N 5/445* | (2011.01) |
| *H04N 21/426* | (2011.01) |
| *H04N 21/431* | (2011.01) |
| *H04N 21/488* | (2011.01) |

(Continued)

(52) U.S. Cl.
CPC ...... *H04N 13/0022* (2013.01); *H04N 5/44508* (2013.01); *H04N 13/007* (2013.01); *H04N 13/0018* (2013.01); *H04N 13/0029* (2013.01); *H04N 13/0062* (2013.01); *H04N 21/42653* (2013.01); *H04N 21/431* (2013.01); *H04N 21/4884* (2013.01); *H04N 21/816* (2013.01); *H04N 21/8146* (2013.01); *H04N 21/4858* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 2006/0203085 A1* | 9/2006 | Tomita | H04N 13/0018 348/51 |
| 2007/0047040 A1 | 3/2007 | Ha | |

(Continued)

FOREIGN PATENT DOCUMENTS

| | | |
|---|---|---|
| KR | 1020010041778 | 5/2001 |
| KR | 100731979 | 6/2007 |

(Continued)

*Primary Examiner* — Sath V Perungavoor
*Assistant Examiner* — Dakshesh Parikh
(74) *Attorney, Agent, or Firm* — Dentons US LLP

(57) ABSTRACT

Disclosed are a method for displaying 3D images and a broadcast receiver. The method for displaying 3D images according to one embodiment of the present invention comprises the steps of: receiving broadcasting signals including video data and 3D object data; decoding the 3D object data, the 3D object data including texts or image information for a 3D object, output position information of the 3D object, and disparity information of the 3D object; obtaining parallax values from the disparity information and producing distortion compensation coefficients using the parallax values; adjusting a display size of the 3D object using the distortion compensation coefficients; and outputting and displaying the 3D object.

12 Claims, 8 Drawing Sheets

(51) Int. Cl.
*H04N 21/81* (2011.01)
*H04N 21/485* (2011.01)

(56) References Cited

U.S. PATENT DOCUMENTS

2008/0292151 A1* 11/2008 Kurtz .................. A61B 3/10 382/128
2009/0142041 A1* 6/2009 Nagasawa .......... H04N 13/0033 386/341
2009/0310021 A1 12/2009 Kondo et al.
2009/0324202 A1 12/2009 Okubo et al.
2010/0165083 A1* 7/2010 Sasaki ............. G11B 20/10527 348/51
2011/0242104 A1 10/2011 Zhang et al.

FOREIGN PATENT DOCUMENTS

| KR | 100738500 | 7/2007 |
| KR | 100812905 | 3/2008 |

* cited by examiner

BROADCASTING RECEIVER AND METHOD FOR DISPLAYING 3D IMAGES

This application is a Continuation of U.S. application Ser. No. 13/521,384, filed Jul. 10, 2012, which claims the benefit of priority of PCT Application No. PCT/KR2011/000136 filed on Jan. 10, 2011 which claims the benefit of priority of U.S. Provisional Application No. 61/294,090 filed on Jan. 11, 2010, all of which are incorporated by reference in their entirety herein.

TECHNICAL FIELD

The present invention relates to a broadcast receiver and a 3D image display method thereof, and more particularly, to a broadcast receiver for displaying a 3D image included in a broadcast signal by adjusting a display effect of a 3D object and a 3D image display method thereof.

BACKGROUND ART

Generally, a 3-dimensional (3D) image (or stereoscopic image) provides a stereoscopic effect using the stereoscopic visual principle of both eyes. Since human depth perception is based upon binocular parallax caused by a distance between the eyes of about 65 mm, the 3D image enables both right and left eyes to respectively view associated plane images, resulting in the stereoscopic effect and the perspective effect.

Such a method for displaying a 3D image may be classified into a stereoscopic scheme, a volumetric scheme, a holographic scheme, etc. In case of the stereoscopic scheme, a left view image to be viewed by the left eye and a right view image to be viewed by the right eye are provided so that the viewer's left eye views the left view image and the viewer's right eye views the right view image through polarized glasses or a display device, resulting in recognition of the 3D image effect.

DETAILED DESCRIPTION OF THE INVENTION

Technical Problems

It is a technical object of the present invention to provide users with more convenient and efficient 3D viewing environments by adjusting a display effect which may be generated when a broadcast receiver receives and displays 3D image data.

Technical Solutions

To achieve the above technical object, a 3D image display method according to one embodiment of the present invention includes receiving a broadcast signal including video data and 3D object data; decoding the 3D object data, wherein the 3D object data includes text or image information about a 3D object, output location information of the 3D object, and disparity information of the 3D object; acquiring a parallax value from the disparity information and calculating a distortion compensation factor using the parallax value; adjusting a display size of the 3D object using the distortion compensation factor; and displaying the 3D object.

To achieve the above technical object, a broadcast receiver according to one embodiment of the present invention includes a broadcast signal receiver for receiving a broadcast signal including video data and 3D object data; a decoder for decoding the 3D object data, wherein the 3D object data includes text or image information about a 3D object, output location information of the 3D object, and disparity information of the 3D object; a graphics engine for acquiring a parallax value from the disparity information, calculating a distortion compensation factor using the parallax value, and adjusting a display size of the 3D object using the distortion compensation factor; and a formatter for displaying the 3D object.

Advantageous Effects

According to the present invention, more convenient 3D image view environments can be provided to users by solving a size distortion phenomenon of an image generated by a perspective effect in which a 3D object appears during display of the 3D object.

BEST MODE FOR CARRYING OUT THE INVENTION

Figure 1:
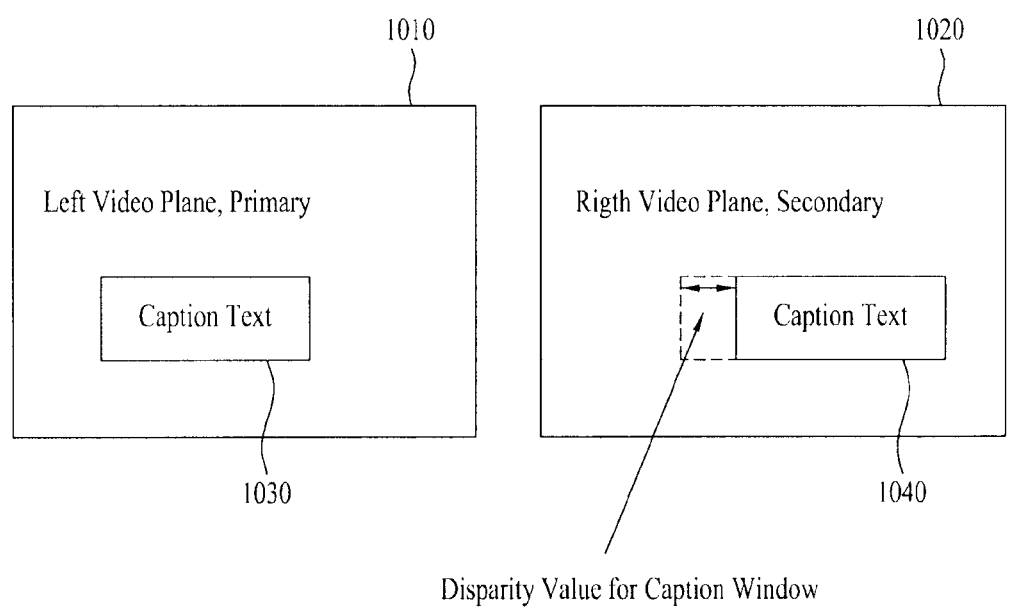
FIG. 1 is a diagram illustrating a 3D object display method according to an embodiment of the present invention.

Reference will now be made in detail to the exemplary embodiments of the present invention, examples of which are illustrated in the accompanying drawings. The present invention should not be limited to the specific embodiments described herein.

Most terms disclosed in the present invention are defined in consideration of functions of the present invention and correspond to general terms well known in the art and may vary according to intention of those skilled in the art, usual practices, or introduction of new technologies. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

A 3D image display method includes a stereoscopic image display scheme in which two viewpoints are considered and a multi-view image display scheme in which three or more viewpoints are considered. In contrast, a conventional single view image scheme may be referred to as a monoscopic image scheme.

The stereoscopic image display scheme uses one pair of right and left images acquired when a left-side camera and a right-side camera spaced apart from each other by a predetermined distance capture the same target object. The multi-view image display scheme uses three or more images captured by three or more cameras spaced apart by a predetermined distance or angle. Although the following description discloses embodiments of the present invention using the stereoscopic image display scheme as an example, the inventive concept of the present invention may also be applied to the multi-view image display scheme.

A stereoscopic image or multi-view image may be compressed and coded for transmission according to a variety of methods including a Moving Picture Experts Group (MPEG) scheme.

For example, the stereoscopic image or multi-view image may be compressed and coded according to an H.264/Advanced Video Coding (AVC) scheme. In this case, a reception system may obtain a 3D image by decoding a received image in reverse order of the H.264/AVC coding scheme.

In addition, one of a left view image and a right view image of stereoscopic images or one of multiple-view images may be assigned as a base layer image and the remaining one may be assigned as an extended layer image. The base layer image may be encoded using the same scheme as a monoscopic imaging scheme. In the extended layer image, only information of the relationship between the base layer image and the extended layer image may be encoded and transmitted. In this case, the base layer image may be referred to as a base view image and the extended layer image may be referred to as an extended view image. As an exemplary compression and coding scheme for the base layer image, JPEG, MPEG-2, MPEG-4, or H.264/AVC may be used. In one embodiment of the present invention, the H.264/AVC scheme is exemplarily used. The compression coding scheme for a higher layer image such as the extended layer image uses an H.264/Multi-view Video Coding (MVC) scheme in one embodiment of the present invention.

If the MVC scheme is used in addition to the AVC scheme for the purpose of stereoscopic image display or if left/right image sequences are coded using the AVC scheme alone, one consideration when it is desired to broadcast 3D content is compatibility with an existing 2D broadcast receiver. To this end, if one of left/right viewpoint images is coded using a backward compatible method and then is transmitted for a legacy broadcast receiver which does not support 3D image display, the 2D broadcast receiver recognizes and generates only a signal corresponding to the backward compatible image so that a user can view content even in the conventional receiver. Hereinafter, a base layer image of a viewpoint transmitted for the legacy broadcast receiver may be referred to as a base view image or a base view video and an extended layer image transmitted for 3D image display may be referred as to an extended view image or an extended view video.

If base view video data and extended view video data are transmitted, the legacy 2D broadcast receiver may display a 2D image based upon the base view video data and the 3D broadcast receiver may display a 3D image based upon the base view video data and the extended view video data.

Nonetheless, a method for displaying image objects (e.g. subtitles or captions) added to a main image becomes problematic.

Hereinafter, an additionally displayed image separate from a main image displayed on a screen will be referred to as a 3D object or a 3D image object. The 3D object may include subtitles, captions, logos, additional menus, etc. provided in addition to the main image of the screen, as an embodiment. That is, a broadcast receiver may receive data for the 3D object and add the data to the main image, thereby displaying the data and image. In this case, the 3D object data received by the broadcast receiver may include caption/graphical data for the 3D object and disparity information for a 3D effect.

FIG. 1 is a diagram illustrating a 3D object display method according to an embodiment of the present invention;

In FIG. 1, a left display image 1010 represents a video plane corresponding to a left view and a right display image 1020 represents a video plane corresponding to a right view. In FIG. 1, a 3D object corresponds to caption texts 1030 and 1040. In case of a stereoscopic image display scheme, both an image corresponding to the left view and an image corresponding to the right view are displayed on one screen. A viewer views the left view image and the right view image through the left eye and the right eye of 3D glasses, respectively. In this case, the left view image and the right view image are displayed apart from each other by a predetermined interval as shown in FIG. 1 and this interval may be referred to as a disparity value.

3D object data may include data about the object (e.g. images, text information, etc.) and information about a disparity value. Upon receiving the 3D object data, a broadcast receiver may process data about an object to display the object as shown in FIG. 1 and may shift an object of an extended view image by a disparity value to display a 3D object.

In FIG. 1, the left view 3D object 1030 and the right view 3D object 1040 are displayed apart from each other by a predetermined disparity value. A viewer views the 3D object having a 3D effect corresponding to an interval of the disparity value.

Figure 2:
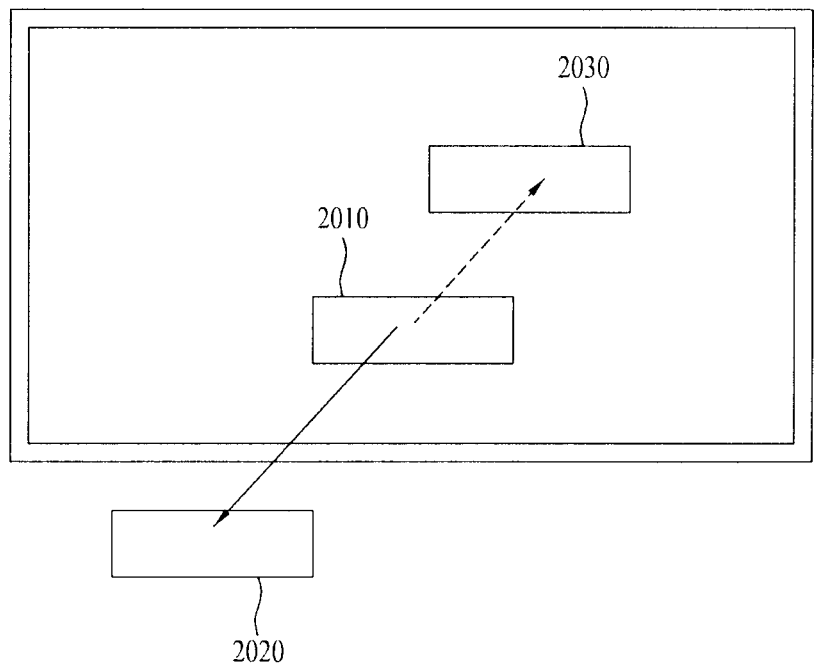
FIG. 2 is a diagram illustrating a 3D effect of 3D object display according to an embodiment of the present invention.

FIG. 2 is a diagram illustrating a 3D effect of 3D object display according to an embodiment of the present invention.

FIG. 2 is a diagram illustrating a 3D effect of a 3D object when the left view image and right view image of FIG. 1 are synthesized and then displayed. As shown in FIG. 1, if the 3D object of the left view image and the 3D object of the right view image are displayed spaced apart by an interval of the disparity value, a 3D effect corresponding to the disparity value appears.

In FIG. 2, a 3D object 2010 shows the case of displaying the 3D object at an original display screen location without a 3D effect. A 3D object 2020 shows the case of displaying the 3D object as if the 3D object appears to move towards the viewer. A 3D object 2030 shows the case of displaying the 3D object as if the 3D object appears to move further from the viewer.

In this case, the viewer recognizes the 3D object 2030, which appears to be far away, as a bigger object than the 3D object 2020, which appears to be close, according to a size constancy principle. In other words, when the viewer recognizes the size of an object, the distance between the viewer and the object has an effect on recognition of the size of the object. Accordingly, if a 3D effect is assigned to objects having the same size, the size of an object is recognized as being big or small in proportion to distance according to distance perception caused by the 3D effect.

In an actual experiment using a 3D object such as 3D caption data or 3D graphics on a stereoscopic display, if distances are adjusted by assigning different disparity values to 3D objects of the same size, the size of a 3D object appears relatively smaller as the 3D object protrude towards a screen, i.e. as the 3D object is near to the viewer.

Thus, variation of the size of a 3D object recognized by a viewer is proportional to distance and, as a result, subtitle/graphic data may be distorted during 3D image view. A method and apparatus which are capable of compensating such distortion are proposed below.

As described above, the broadcast receiver receives 3D object data which includes graphic data or image data for the 3D object and disparity information for producing a 3D effect. According to the present invention, a method is proposed for resizing a 3D object by calculating a distortion compensation factor so as to compensate for a distorted size caused by a 3D effect.

A disparity value included in the disparity information denotes a difference in distance between a left view image and a right view image on a display screen and may typically be expressed as a pixel unit. In contrast, a parallax value denotes a distance of an image focused on a screen and may be expressed in inches or centimeters. Hereinafter, a description will be given of the method for resizing a 3D object by calculating the parallax value using the disparity value included in the received 3D object data and calculating a distortion compensation factor using the calculated parallax value.

Figure 3:
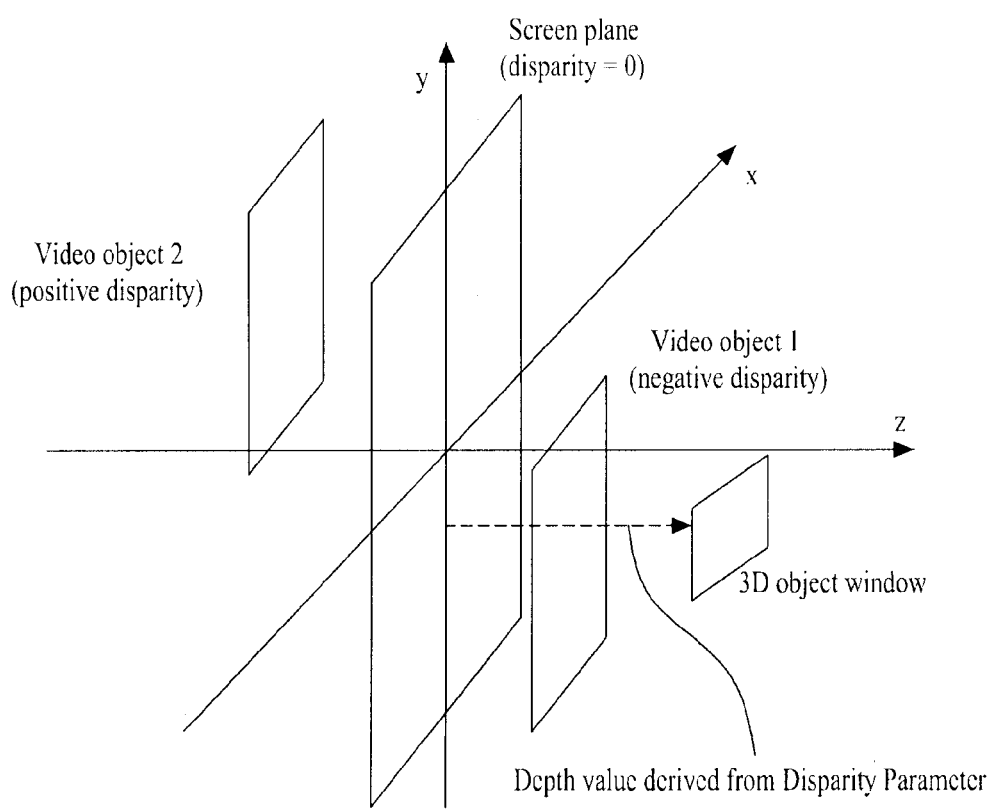
FIG. 3 is a diagram illustrating 3D object display in accordance with a disparity value according to an embodiment of the present invention.

FIG. 3 is a diagram illustrating 3D object display in accordance with a disparity value according to an embodiment of the present invention.

If the left and right view images are displayed according to a disparity value as illustrated in FIG. 1 and FIG. 2, a 3D object viewed by a viewer is illustrated in FIG. 3.

In FIG. 3, an x-y plane corresponds to a screen when a disparity value is 0. A video object 1 has a negative disparity value and has a 3D effect as if the video object 1 appears to move towards the viewer from the screen. A video object 2 has a positive disparity value and has a 3D effect as if the video object 2 appears to move further from the viewer towards the screen.

A broadcast receiver receives 3D object data and processes graphic data/image data to express an object on the x-y plane. Next, the broadcast receiver displays a 3D object so as to produce an effect on the z axis according to a disparity value.

Namely, the aforementioned size distortion phenomenon occurs according to the effect on the z axis related to the disparity value. Therefore, a distortion compensation factor may be calculated using the disparity value.

Figure 4:
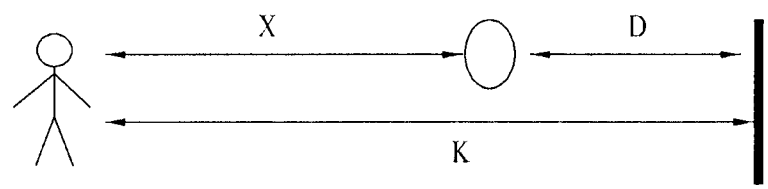
FIG. 4 is a diagram illustrating an interval between a user, an image, and a screen during 3D image display according to an embodiment of the present invention.

FIG. 4 is a diagram illustrating an interval between a user, an image, and a screen during 3D image display according to an embodiment of the present invention.

Referring to FIG. 4, an interval between a 3D object and a user is denoted by X, an interval between the user and a display screen is denoted by K, and an interval between the 3D object and the display screen is denoted by D (=K−X).

Hereinbelow, the case in which the size of a 3D object is compensated based on a disparity value of 0 will be exemplarily described. Since graphic/image data included in 3D object data received by a broadcast receiver is graphic/image data expressing an object image when a disparity value is 0 and a 3D object is displayed with distances according to the disparity value, a compensation factor will be calculated based on the size of the 3D object when the disparity value is 0.

First, the interval X between the 3D object and the user may be represented by the following Equation 1:

$$X = K*Id/(Id-p) \quad \text{[Equation 1]}$$

In Equation 1, K denotes a distance between a screen and user eyes, Id denotes an interocular distance, and p denotes a parallax on the screen.

The parallax may be expressed using a disparity value and may be represented by Equation 2 below:

$$p = d*(16/\sqrt{337}))*S/vw \quad \text{[Equation 2]}$$

In Equation 2, p denotes a parallax value, d denotes a disparity value, S denotes a diagonal size of a screen, and vw denotes the width of a coded video.

Equation 2 represents a parallax using a disparity value when a screen ratio is 16:9 in one an embodiment. When a disparity value is −50 on a 47-inch Full High-Definition (HD) TV, a parallax value corresponds to −2.7 cm. In this case, if a user views an object on a screen from a distance of 5 m, a distance between the user and the object recognized by the user corresponds to 3.53 m.

As indicated by Equation 3, a distortion compensation factor may be calculated using Equation 1 and Equation 2.

$$F = K/X \quad \text{[Equation 3]}$$
$$= (Id - p)/Id$$

First, a distortion compensation factor F may be expressed as K/X through which an optical illusion caused by the distance perception of a 3D object is compensated. This distortion compensation factor F may be expressed by (Id−p)/Id using Equation 1. In other words, the broadcast receiver may obtain the distortion compensation factor using Equation 3 which calculates a parallax value using disparity information included in received 3D object data. The interocular distance Id may be a set average value or may be an interocular value input by a user.

The broadcast receiver may adjust display of a 3D object by adjusting the original size of a 3D object image according to the distortion compensation factor.

3D object data is included in a broadcast signal. In the embodiment of the present invention, a 3D object includes captions or subtitles. If the 3D object corresponds to captions or subtitles, the 3D object data may be received in video data of a broadcast signal or may be received through an additional Elementary Stream (ES). The above-described 3D image compensation method will be described below with respect to each case. Captions or subtitles will be exemplarily described as an example of the 3D object.

Figure 5:
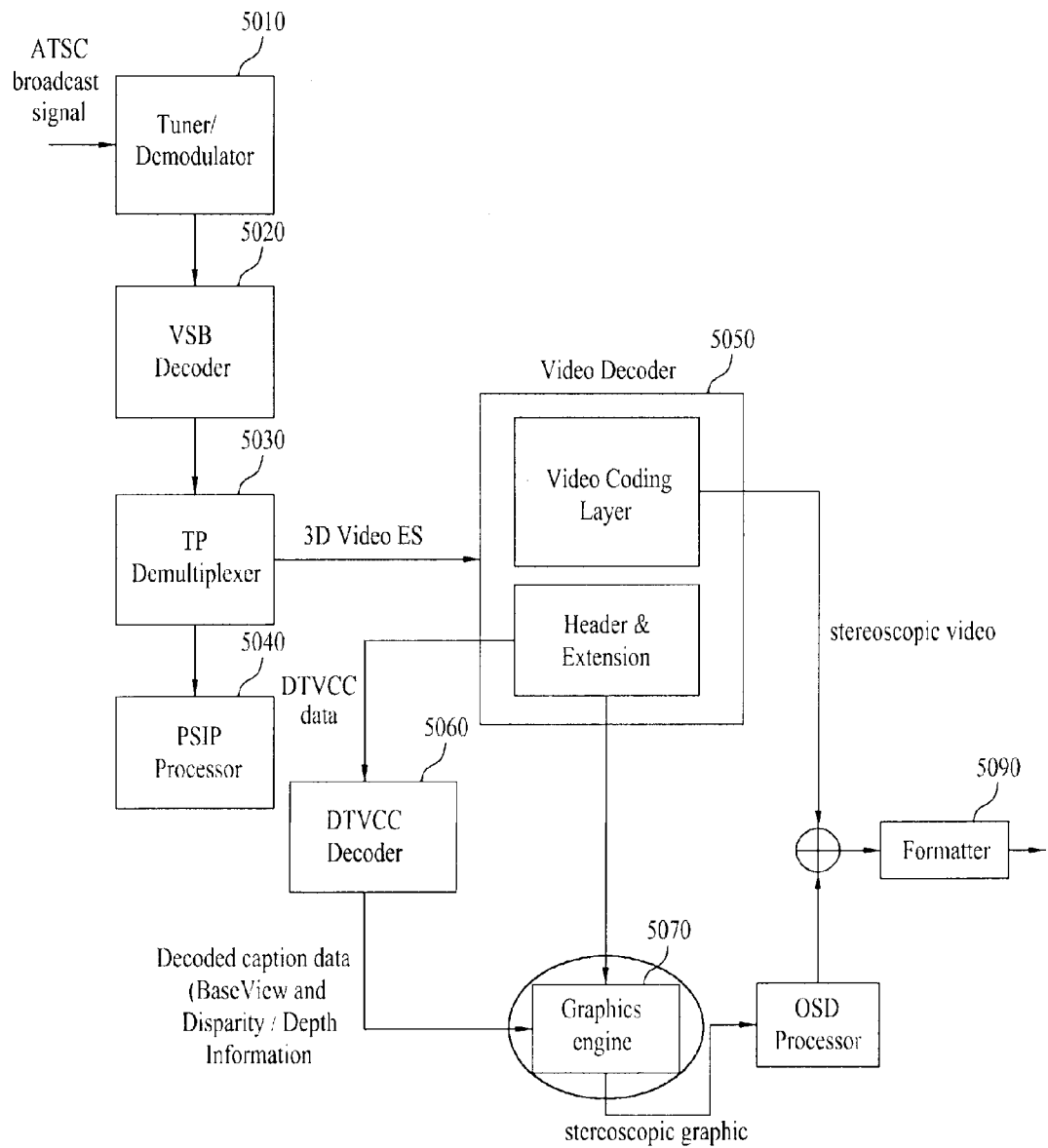
FIG. 5 is a diagram illustrating a broadcast receiver according to an embodiment of the present invention.

FIG. 5 is a diagram illustrating a broadcast receiver according to an embodiment of the present invention.

The broadcast receiver of FIG. 5 shows an embodiment of a broadcast receiver for processing caption data received in a header region of video data. As an embodiment, the broadcast receiver of FIG. 5 may be a broadcast receiver for receiving and processing a broadcast signal of an Advanced Television System Committee (ATSC) system. Hereinafter, the caption data may be referred to as DTV Closed Caption (DTVCC).

The broadcast receiver includes a tuner/demodulator 5010 for tuning and demodulating a broadcast signal, a Vestigial Side Band (VSB) decoder 5020 for decoding a VSB for a received broadcast signal and generating a broadcast stream, a Transport stream (TP) demultiplexer 5030 for demultiplexing the broadcast stream to generate a Program and System Information Protocol (PSIP) data ES, a video ES, etc., a PSIP processor 5040 for processing PSIP data to obtain system information, a video decoder 5050 for decoding video data included in a 3D video ES, a DTVCC decoder 5060 for receiving and decoding DTVCC data from the video decoder, a graphics engine 5070 for performing scaling with respect to a decoded caption in consideration of disparity/depth, an On Screen Display (OSD) processor 5080 for OSD-processing a scaled caption, and a formatter 5090 for output-formatting a main video and an OSD screen. The tuner/demodulator 5010 and the VSB decoder 5020 are collectively referred to as a broadcast signal receiver. The graphics engine may be referred to as a 3D graphics processor. Each of the video decoder and the DTVCC decoder may be referred to as a decoder.

The broadcast receiver of FIG. 5 receives and demodulates a broadcast signal including 3D broadcast data through the tuner/demodulator. The broadcast signal includes 3D video data, audio data, and additional data. DTVCC (caption) data may be included in a picture user data part of a header region of the video data. The broadcast receiver of 3D video VSB-decodes the received broadcast signal through the VSB decoder and generates the decoded signal as a Transport Stream (TS).

The TP multiplexer 5030 of the broadcast receiver outputs signaling information included in the broadcast signal to the PSIP processor 5040. The PSIP processor 5040 determines a Packet Identifier (PID) of a video ES using the signaling information. The signaling information represents PSI/PSIP information. The PSIP information may include information about a Program Map Table (PMT), a Virtual Channel Table (VCT), and Event Information Table (EIT).

The broadcast receiver performs PID filtering through the TP demultiplexer 5030 to output 3D video data to the video decoder 5050. The video decoder 5050 decodes the 3D video data and outputs DTVCC data included in a header of the 3D video data (e.g. a header and extension region of MPEG2 video data) to the DTVCC decoder 5060.

The DTVCC decoder 5060 decodes DTVCC data. The DTVCC data may include at least one of caption data, viewpoint information, and disparity/depth information. The caption data includes image or text data for a caption to be output and information about an output location (coordinate information).

The broadcast receiver processes the caption data using the graphics engine 5070. First, the broadcast receiver determines caption output coordinates on a left/right video plane using the disparity information included in the DTVCC data. The broadcast receiver calculates a parallax which is a distance between caption data on a video screen from a disparity using the above Equation 1 to Equation 3 in consideration of the size of the video screen, video resolution, etc. For example, in case of a caption output on a full HD screen video on a 47-inch 3D TV, a parallax value corresponding to a disparity of −50 pixels is −2.7 cm. If the parallax value is calculated, a distortion compensation factor can be calculated using the parallax value and an interocular distance by Equation 3. In case of adults, the interocular distance may use 6.5 cm as a basic value or may use a value input by a user.

The broadcast receiver adjusts the size of a caption to be finally output using the calculated distortion compensation factor. The size of the caption may be adjusted by multiplying a font size or image size of the caption by the distorting compensation factor. That is, the size of the finally displayed caption is adjusted in proportion to distances such that the caption in the forward direction of a screen becomes smaller and the caption in the backward direction of the screen becomes larger.

Figure 6:
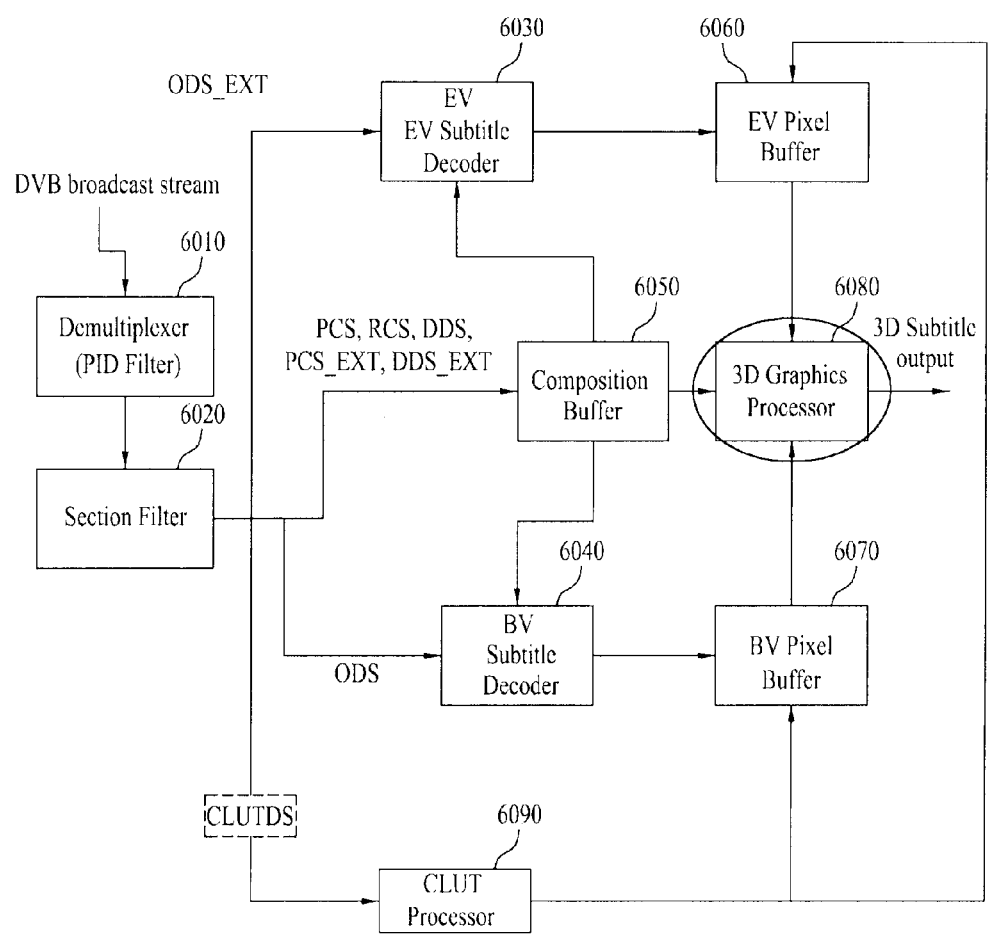
FIG. 6 is a diagram illustrating a broadcast receiver according to another embodiment of the present invention.

FIG. 6 is a diagram illustrating a broadcast receiver according to another embodiment of the present invention.

Unlike the broadcast receiver of FIG. 5, the broadcast receiver of FIG. 6 shows an embodiment of a broadcast receiver for processing caption data when the caption data is received in a separate stream. In the embodiment of FIG. 6, the caption data may be referred to as subtitle data. As an embodiment, the broadcast receiver of FIG. 6 may be a broadcast receiver for receiving and processing a broadcasting signal of a Digital Video Broadcasting (DVB) system.

The subtitle data includes subtitle data for a base view and subtitle data for an extended view. The subtitle for the base view includes display definition information for display window configuration necessary for displaying the subtitle, page composition information, region composition information, and object data information which may be referred to as a Display Definition Segment (DDS), a Page Composition Segment (PCS), a Region Composition Segment (RCS), and an Object Data Segment (ODS), respectively, in a syntax structural meaning during transmission. The subtitle data for the extended view may be referred to as extended subtitle data for 3D display and may include DDS_EXT, PCS_EXT, RCS_EXT, and ODS_EXT as in the subtitle data for the base view. Disparity information or depth information for 3D display may be included in at least one of the subtitle data for the base view and the subtitle data for the extended view. The extended subtitle data may include information about subtitle output locations or coordinates and disparity information.

The broadcast receiver of FIG. 6 includes a broadcast signal receiver (not shown) for receiving and demodulating a broadcast signal to generate a broadcast stream, a demultiplexer 6010 for extracting subtitle data using a PID corresponding to subtitle data from the broadcast stream, a section filter 6020 for filtering the subtitle data according to each section, an Extended View (EV) subtitle decoder 6030 for decoding subtitle data for an extended view, a Base View (BV) subtitle decoder 6040 for decoding subtitle data for a base view, a composition buffer 6050 for buffering data according to each section, an EV pixel buffer 6060 for buffering the subtitle data for the extended view, a BV pixel buffer for buffering the subtitle for the base view, a 3D graphic processor 6080 for receiving data from each buffer, reading and processing the data, and displaying 3D subtitles, and a Color Look Up Table (CLUT) processor 6090 for processing a CLUT Definition Segment (CLUTDS). Hereinafter, each of the EV subtitle decoder 6030 and the BV subtitle decoder 6040 may be referred to as a decoder, and each of the EV pixel buffer 6060 and the BV pixel buffer 6070 may be referred to as a pixel buffer. The 3D graphics processor 6080 may be referred to as a graphics engine.

The broadcast receiver determines a PID for video data and subtitle data using signaling information (PMT etc.). As an embodiment, DVB subtitle data may have a PID of a stream, a type value of the stream being 0x06.

The broadcast receiver divides a broadcast stream into a video stream and a subtitle stream (data) through the demultiplexer 6010 and outputs the streams to the decoder. The broadcast receiver extracts subtitle data using data_identifier information and subtitle_stream_id information included in a PES_packet_data_byte region from a stream (e.g. Packetized Elementary Stream (PES)) corresponding to the subtitle data through the section filter 6020 and may generate the subtitle data according to each section in consideration of segment_type information.

The broadcast receiver decodes the subtitle data through the decoders 6030 and 6040. The 3D graphics processor 6080 processes the decoded subtitle data and generates a 3D subtitle. Like the above-described caption data, the subtitle data includes image or text information for the subtitle, subtitle output location or coordinate information, and disparity or depth information for a 3D effect.

Operation of the 3D graphics processor 6080 is similar to operation of the graphics engine described with reference to FIG. 5 and will be described below.

The broadcast receiver determines output coordinates of subtitle graphic data on a video plane of a left/right view (base view and extended view) using disparity information through the 3D graphics processor 6080. The broadcast receiver calculates a parallax which is a distance between caption data on a video screen from the disparity information using the above Equation 1 to Equation 3 in consideration of the size of the video screen, video resolution, etc. For example, in case of a caption output on a full HD screen video on a 47-inch 3D TV, a parallax value corresponding to a disparity of −50 pixels is −2.7 cm. If the parallax value is calculated, a distortion compensation factor can be calculated using the parallax value and an interocular distance by Equation 3. In case of adults, the interocular distance may be 6.5 cm as a basic value or may be a value input by a user.

The broadcast receiver adjusts the size of a caption to be finally output using the calculated distortion compensation factor. The size of the caption may be adjusted by multiplying a font size or image size of the caption by the distortion compensation factor. That is, the size of the finally displayed caption is adjusted in proportion to distances such that the caption in the forward direction of a screen becomes smaller and the caption in the backward direction of the screen becomes larger.

Figure 7:
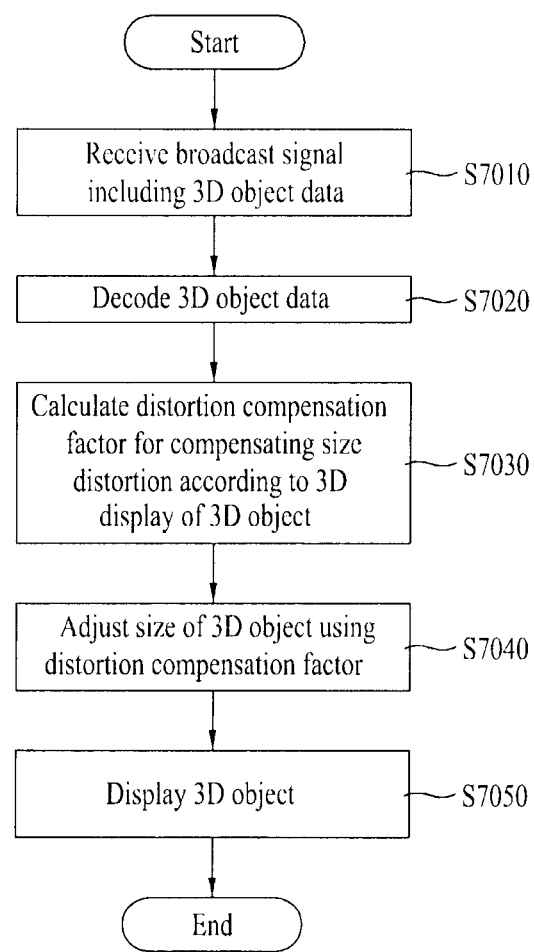
FIG. 7 is a flowchart illustrating a 3D object display method according to an embodiment of the present invention.

FIG. 7 is a flowchart illustrating a 3D object display method according to an embodiment of the present invention.

The 3D object display method of FIG. 7 shows a 3D object display method performed in the broadcast receiver shown and described in FIG. 5 and FIG. 6.

The broadcast receiver demodulates a broadcast signal including 3D object data using the broadcast signal receiver (S7010). A 3D object represents an image other than a main video, for example, captions, subtitles, menus, and logos provided to a user. In case of captions and subtitles, the 3D object data may be included in a header region of video data or may be received through a separate ES, as described previously.

The broadcast receiver decodes the 3D object data using the decoder (S7020). The 3D object data includes image information about at least one of text, graphics, and moving pictures for the 3D object, location information about a location on a screen at which the 3D object is to be displayed, and disparity or depth information necessary for producing a 3D effect. The location information may include coordinate information for locations at which the 3D object is positioned on the screen.

The broadcast receiver calculates a distortion compensation factor for compensating size distortion according to 3D display of the 3D object through the graphics engine or 3D graphics processor (S7030). In more detail, if disparity information is included in the 3D object data, the broadcast receiver calculates a parallax value from a disparity value using the above equations. A distortion compensation factor may be calculated from the parallax value and an interocular distance through the above equations. The interocular distance may be a preset default value (e.g. 6.5 cm) or may be another value according to race, sex, and age of a user. The interocular distance input by a user may also be used.

If depth information is included in the 3D object data, the distortion compensation factor may be calculated directly using the depth information. In the distortion compensation factor F=K/X of Equation 3, K denotes a distance between a screen and a viewer and X denotes a value obtained by converting a depth value D into a physical distance. That is, if the depth value is defined as a value between 0 and 255, the physical value X perceived by a viewer during display on an actual 3D screen with respect to those values is present. The broadcast receiver may calculate depth coded to an image as a distance perceived by a viewer or may acquire the value X using depth mapping information obtained by mapping the depth to a physical distance, thereby directly calculating the distortion compensation factor using the value X. In other words, the distortion compensation factor F may be calculated by F=K/X=K/(K−D) where D denotes a physical distance value obtained by mapping the depth value to a distance between a screen and a 3D object. Nonetheless, a preset value or a value input by a user may be used as the distance between the screen and the viewer.

The broadcast receiver adjusts the size of the 3D object using the distortion compensation factor through the graphics engine or 3D graphics processor (S7040). The size of the 3D object may be adjusted by multiplying the distortion compensation factor by the font or image size of the caption. Namely, the size of the 3D object is adjusted by multiplying the distortion compensation factor by a font size or the width/length size of the image. The finally displayed 3D object is output such that the caption in the forward direction of a screen becomes smaller and the caption in the backward direction of the screen becomes larger.

Finally, the broadcast receiver outputs the size-adjusted 3D object (S7050).

The size of the 3D object is automatically adjusted. However, the size of the 3D object may be adjusted according to user selection. That is, a User Interface (UI) which is capable of adjusting the size of the 3D object according to user input is displayed and the size of the 3D object can be adjusted according to user selection. When a user increases or decreases the size of the 3D object, the size of the 3D object may be adjusted by receiving a size variation corresponding to the increased or decreased size and reflecting the size variation in the distortion compensation factor.

Figure 8:
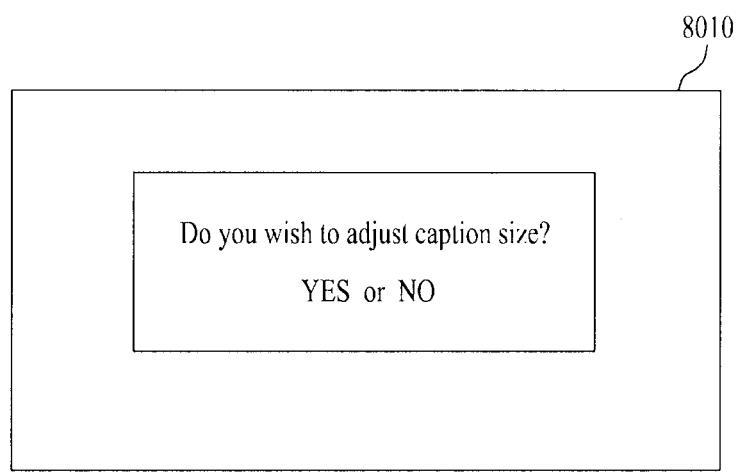
FIG. 8 is a diagram illustrating a UI for adjusting the size of a 3D object according to an embodiment of the present invention.
Figure 8:
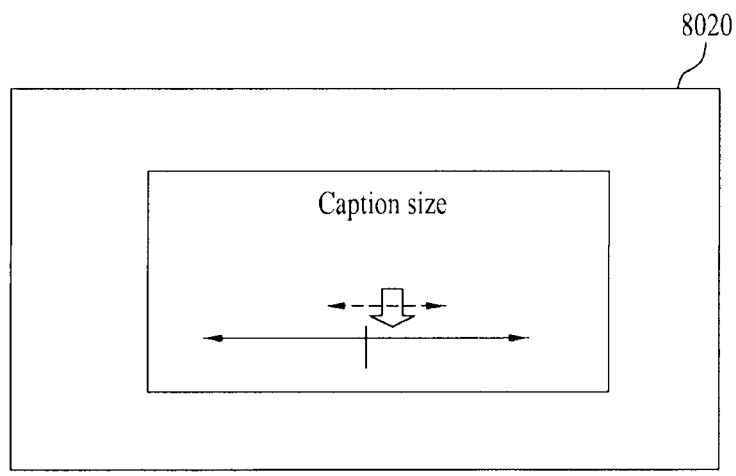

FIG. 8 is a diagram illustrating a UI for adjusting the size of a 3D object according to an embodiment of the present invention.

In FIG. 8, a caption is illustrated as the 3D object.

The broadcast receiver may display a UI for changing the size of a caption, such as a screen 8010. The UI may be activated by user input or may be automatically activated when the caption is displayed.

If a user selects a size change through input means such as a remote controller (the case in which the user selects 'YES' through the UI of the screen 8010), the broadcast receiver may display the UI of a screen 8020. The user may adjust the size of the caption by shifting an arrow as indicated by dotted lines through user input means.

If the size of the caption is input, the broadcast receiver may adjust the size of the caption by performing steps after step S7030 in FIG. 7. In other words, the step of receiving the adjustment of the caption size from a user by displaying the UI of the 3D object may be performed between steps S7020 and S7030 or between steps S7030 and S7040.

MODE FOR INVENTION

As described previously, various embodiments have been described in the best mode for carrying out the invention.

INDUSTRIAL APPLICABILITY

As described above, the present invention may be totally or partially applied to a digital broadcasting system.

The invention claimed is:

1. A method of processing 3D broadcast data, comprising:
receiving a broadcast signal including signaling information, video data and 3D object data;
decoding the 3D object data, wherein the 3D object data includes data about a 3D object,
wherein the broadcast signal includes disparity information of the 3D object;
acquiring a parallax value from the disparity information and calculating a distortion compensation factor using the parallax value,
wherein the distortion compensation factor is calculated by the distortion compensation factor=(an interocular distance value−the parallax value)/an interocular distance value;
adjusting a display size of the 3D object by multiplying the display size of the 3D object by the calculated distortion compensation factor; and
displaying the 3D object having the adjusted display size.

2. The method of claim 1, wherein the data about the 3D object includes at least one of image information and text information.

3. The method of claim 1, wherein the 3D object data includes at least one of output location information of the 3D object and depth information of the 3D object.

4. The method of claim 1, wherein the 3D object data includes caption data and the 3D object data is included in a header part of the video data.

5. The method of claim 1, wherein the 3D object data includes subtitle data and the 3D object data is received through an Elementary Stream (ES) separate from the video data.

6. The method of claim 3, wherein the distortion compensation factor is calculated by using the depth information.

7. An apparatus of processing 3D broadcast data, comprising:
a receiver for receiving a broadcast signal including signaling information, video data and 3D object data;
a decoder for decoding the 3D object data, wherein the 3D object data includes data about a 3D object,
wherein the broadcast signal includes disparity information of the 3D object;
a graphics engine for acquiring a parallax value from the disparity information, calculating a distortion compensation factor using the parallax value, and adjusting a display size of the 3D object by multiplying the display size of the 3D object by the calculated distortion compensation factor,
wherein the distortion compensation factor is calculated by the distortion compensation factor=(an interocular distance value−the parallax value)/an interocular distance value; and
a formatter for displaying the 3D object having the adjusted display size.

8. The apparatus of claim 7, wherein the data about the 3D object includes at least one of image information and text information.

9. The apparatus of claim 7, wherein the 3D object data includes at least one of output location information of the 3D object and depth information of the 3D object.

10. The apparatus of claim 7, wherein the 3D object data includes caption data and the 3D object data is included in a header part of the video data.

11. The apparatus of claim 7, wherein the 3D object data includes subtitle data and the 3D object data is received through an Elementary Stream (ES) separate from the video data.

12. The apparatus of claim 9, wherein the distortion compensation factor is calculated by using the depth information.

* * * * *